United States Patent [19]
Davis et al.

[11] 4,270,214
[45] May 26, 1981

[54] HIGH IMPEDANCE TAP FOR TAPPED BUS TRANSMISSION SYSTEMS

[75] Inventors: William W. Davis, Rosemount; Ernest S. Griffith, St. Louis Park, both of Minn.

[73] Assignee: Sperry Corporation, New York, N.Y.

[21] Appl. No.: 23,795

[22] Filed: Mar. 26, 1979

[51] Int. Cl.³ .............................................. H04B 1/48
[52] U.S. Cl. .................................... 455/80; 333/136; 370/32; 375/7; 375/36
[58] Field of Search ............... 333/128, 238, 246, 116, 333/127, 136; 375/7, 36; 455/80; 370/32

[56] References Cited

U.S. PATENT DOCUMENTS

| | | | |
|---|---|---|---|
| 2,938,175 | 5/1960 | Sommers et al. | 333/246 X |
| 3,422,377 | 1/1969 | Vient | 333/128 X |
| 3,539,966 | 11/1970 | Logan | 333/238 X |
| 3,794,759 | 2/1974 | Nick | 333/116 X |
| 3,824,500 | 7/1974 | Rothenberg | 333/136 |
| 3,852,690 | 12/1974 | Telfer | 333/246 |
| 3,900,805 | 8/1975 | Stevens | 333/116 |
| 4,009,456 | 2/1977 | Hopfer | 333/81 A |
| 4,038,601 | 7/1977 | Laborie et al. | 375/7 |
| 4,086,534 | 4/1978 | Olson | 375/7 |

*Primary Examiner*—Paul L. Gensler
*Attorney, Agent, or Firm*—Douglas L. Tschida; Kenneth T. Grace; William E. Cleaver

[57] ABSTRACT

An electrically and mechanically modular design of a high impedance, passive tap is disclosed for use in distributed, serial transmission systems to provide a tap connection to the primary transmission line with minimum loading and reflection. The tap is comprised of the cable connectors and a microstrip circuit compatible with an associated transceiver.

1 Claim, 18 Drawing Figures

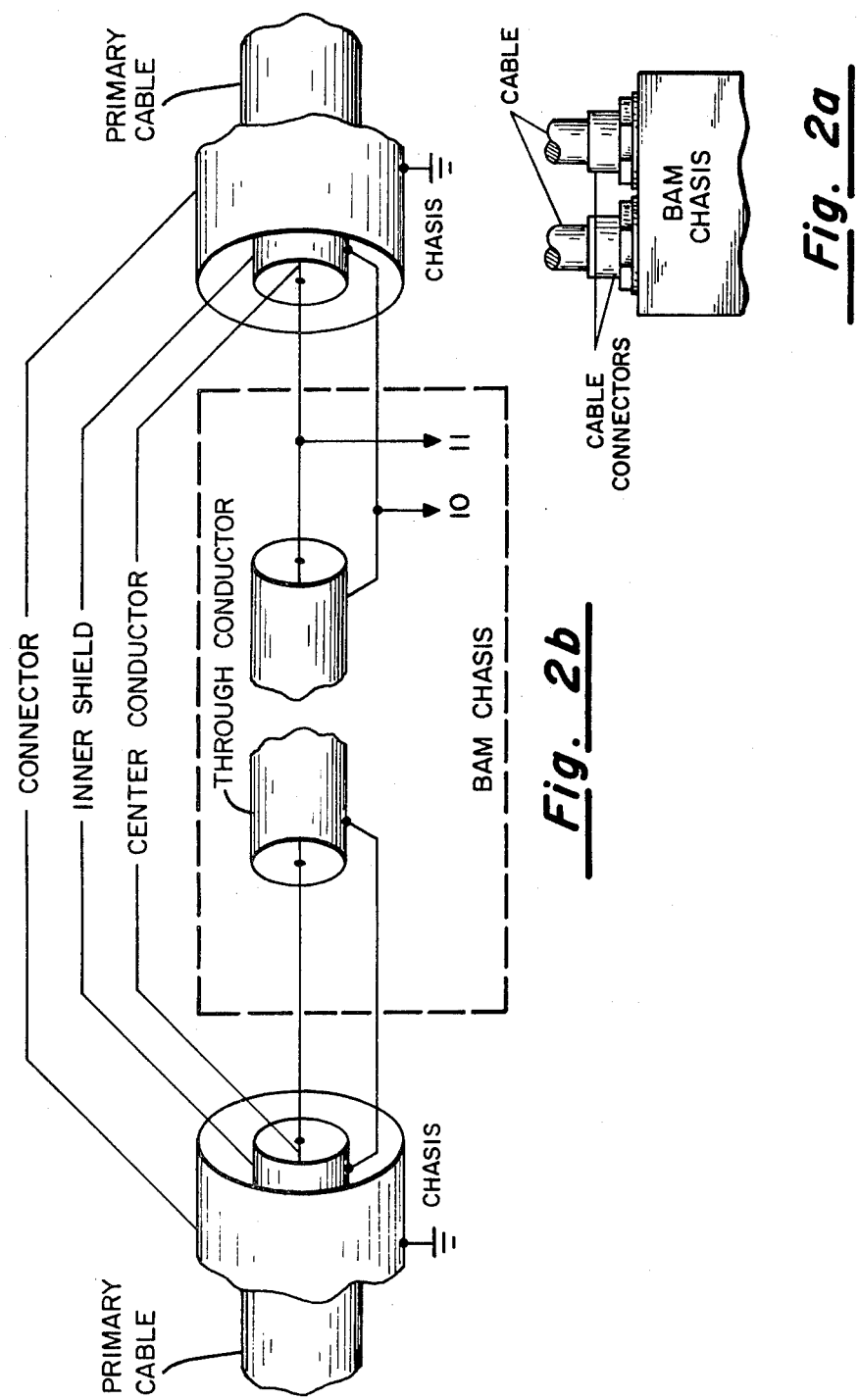

HIGH IMPEDANCE TAP FOR TAPPED BUS TRANSMISSION SYSTEMS

The present invention relates to distributed transmission systems and more specifically to an electrically and mechanically modular tap and transceiver design for passively coupling a maximum number of users to the transmission line. For any given distributed transmission system having the requirement of minimizing point-to-point wiring while maintaining optimum data communications between an optimum number of geographically and functionally distinct users, it is necessary to make numerous passive connections or taps to the transmission line. As the number of taps and users increase, however, there are associated problems with loading and reflections on the transmission line which affect the integrity of the data and control information being transmitted and received over the line.

The present invention accommodates these requirements in a high impedance tap design that maintains the integrity of the transmission line.

SUMMARY OF THE INVENTION

The present invention teaches a high impedance, passive tap for use with a transceiver to minimize the reflections and loading on a transmission line to which the tap is coupled. The tap is comprised of a pair of connectors, compatible with the transmission line being used, and a microstrip circuit having a plurality of plated through holes. The tap further comprises high impedance components, with respect to the transmission line, mounted on the microstrip to minimize interconnection distances; and the combination fabricated and arranged to match the impedance characteristics of the transmission line to minimize the reflection-producing discontinuities that occur with the tapping of the transmission line. The minimization of reflections and loading at each tap thus minimizes the summed effect of such disturbances on information signals being transmitted and received in a distributed system, which summed effects become critical when the signal level is relatively low and a maximum number of taps are required.

BRIEF DESCRIPTION OF THE DRAWINGS

FIG. 2A is a diagram indicating the relationship of the BAM, transmission line and connectors.

FIG. 2B is a diagram indicating the relative positions for interconnecting a through conductor to the cable connectors.

DESCRIPTION OF THE PREFERRED EMBODIMENT

The present invention teaches a modular bus access module (BAM) assembled from discrete procurable components for use with distributed bus transmission systems. The design of the module is such as to permit systems requiring a maximum number of passive taps to the transmission line and to enable the operation of the systems in a point-to-point mode or in a broadcast mode to the various users associated with the system. To achieve the large number of taps to the transmission line, and maintain information integrity, it is necessary that the tap design minimize reflections and loading on the line during the system's various modes of operation.

Figure 1:
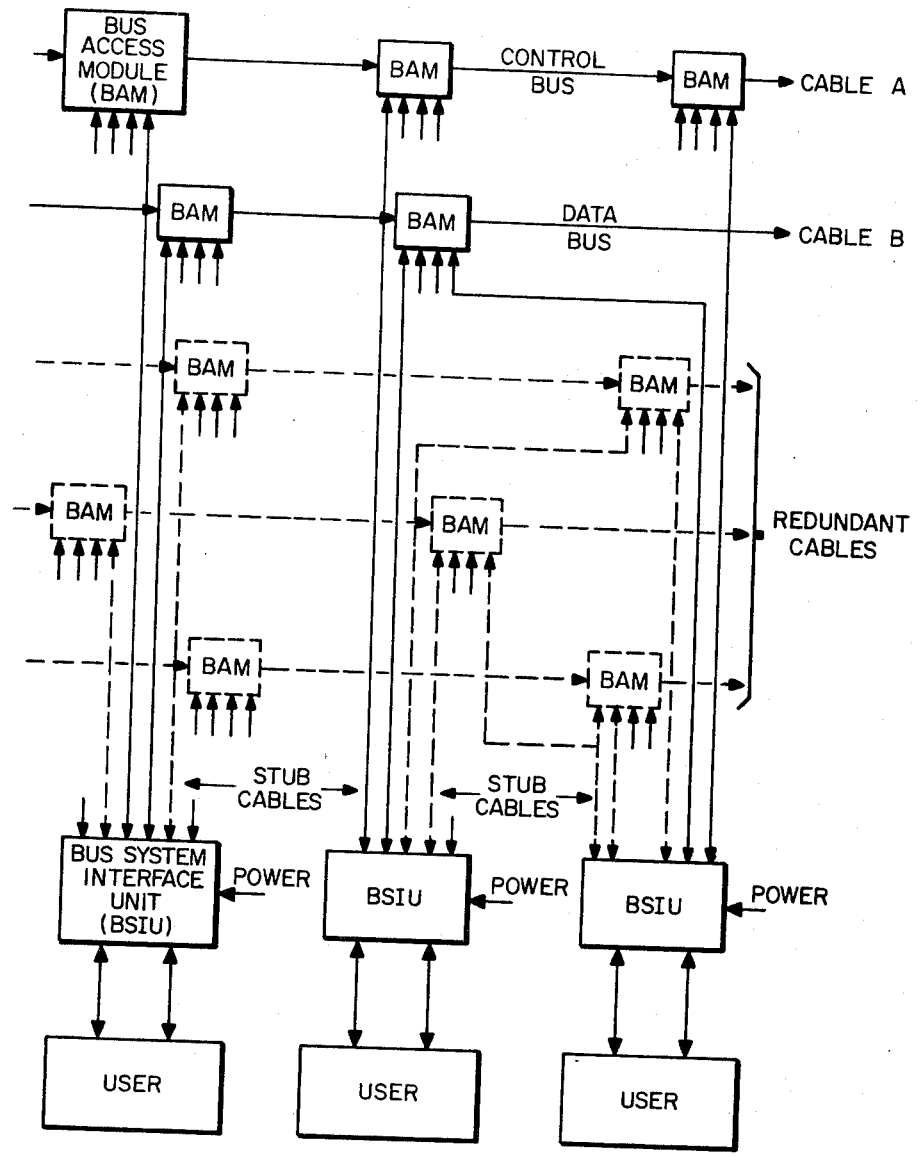
FIG. 1 is a block diagram of a distributed transmission system using the bus access modules (BAMS) of the present disclosure.

Referring to FIG. 1, a bus transmission system within which the present invention is incorporated is configured of at least two triaxial cables, one cable handling data transmissions and one handling control transmissions. The control and data information is transmitted as a low-level serial, bi-phase Manchester coded signal at ±0.6 volt levels over the transmission lines and is accessed by the users at their associated bus access modules (BAM) coupled to the control and data transmission lines. The information is received from or transmitted to the transmission line by each user, wherein a user may be a computer or peripheral device, via the individual bus access modules and an associated bus system interface unit (BSIU).

The BSIU, like the bus access module, is of a modular design and acts as the user's interface to the transmission system. The BSIU controls all bus communications within the system and essentially operates as an input/output vectoring control, directing the flow of information and enabling any user to communicate in either a point-to-point or broadcast mode with the other users sharing the system. Each BSIU has the further capability of becoming the controlling BSIU for the system.

For a system to support a large number of users in many geographically distributed locations, it is desirable to maintain maximum flexibility with respect to the physical connections to the transmission lines, but as the number of connections increase so do the attendant problems of loading and reflections, since some loss of signal occurs at each connection and since perfect impedance matching at each discontinuity is difficult to obtain.

To overcome the above problems and to properly support the geographically distributed users, it is necessary that the bus access module electrically appear as a high impedance load with respect to the transmission line as well as be isolated from the transmission line if a failure such as an open or short circuit were to occur within any BAM, BSIU or user. The tap and transceiver design described herein are incorporated in each of the access modules, and they act to passively isolate the transmission line from the BSIU and users via transformer coupling, a series/parallel diode combination and a voltage divider-differential amplifier combination.

Figure 2C:
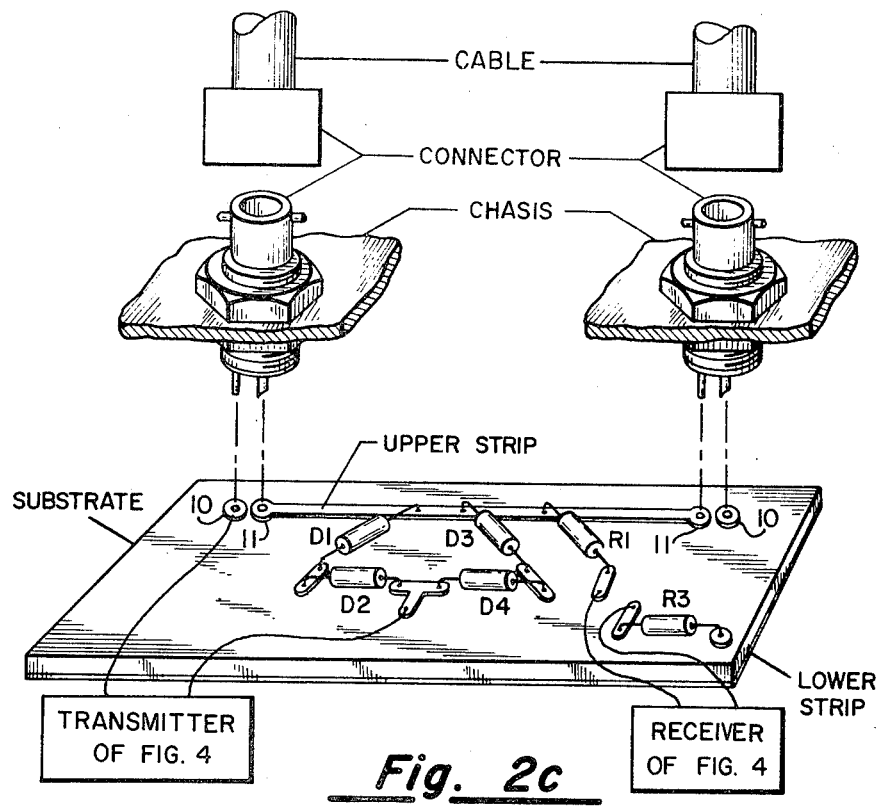
FIG. 2C is a diagram of an improved high impedance through conductor.

Referring to FIGS. 2A, 2B, 2C, 2D and 2E, an access module is physically connected to the triaxial transmission line by terminating lengths of the triaxial cable at appropriate connectors to the access module and making the through connection via a through conductor, shown in FIG. 2B as a coaxial cable, having an impedance characteristic matching the triaxial cable and providing terminals on the through conductor to which the transceiver circuitry within the access module can be connected.

If a through conductor not having the same impedance characteristic as the transmission line is used, a DC offset is produced in the transmission line's untapped voltage level, and the reflections produced by the connectors and the transceiver, coupled to the through conductor, algebraically add to this offset level, and thereby either increasing or decreasing the peak amount of reflection at each tap connection.

While the reflection at a single tap is small, on the order of millivolts, relative to the 0.60 volt signal level, it must be recognized that for distributed systems having numerous taps, high data throughput rates, small signal levels and varying cable lengths, the reflections from each access module will in the worst case add, thereby producing reflection signals that can become indistinguishable from the information signals. It must also be recognized that while reflections from successive access modules in a system diminish due to the attenuation of the transmission line, the summed effect can still be significant depending of the required signal level.

The worst case effects occur in systems where the transmission line delay between access modules is equal and equal to one half the pulse period, so that the reflections, caused by each access module are in phase. The individual reflections in this case, when summed together at any one access module, produces the highest peak-to-peak reflections, and if this summed reflection is offset due to through conductor mismatch, the overall reflection may increase further. It is desirable to match the impedance of the combination of the through conductor and the transceiver circuit loading to the transmission line so that the reflection due to the transceiver circuitry coupled to the transmission line oscillates about and on the average is equal to the untapped impedance level of the transmission line.

Figure 2D:
FIG. 2D is a representation of a reflection signal from an access module having a coaxial through conductor as shown in FIG. 2B.
Figure 2E:
FIG. 2E is a representation, at the same scale as in FIG. 2D, of a reflection signal from an access module having a microstrip circuit similar to that shown in FIG. 2C.
Figure 4:
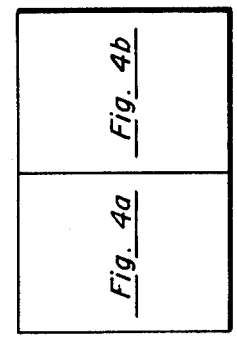
FIG. 4 is comprised of FIGS. 4a and 4b a schematic diagram of the best mode embodiment of the high impedance transceiver.
Figure 4A:
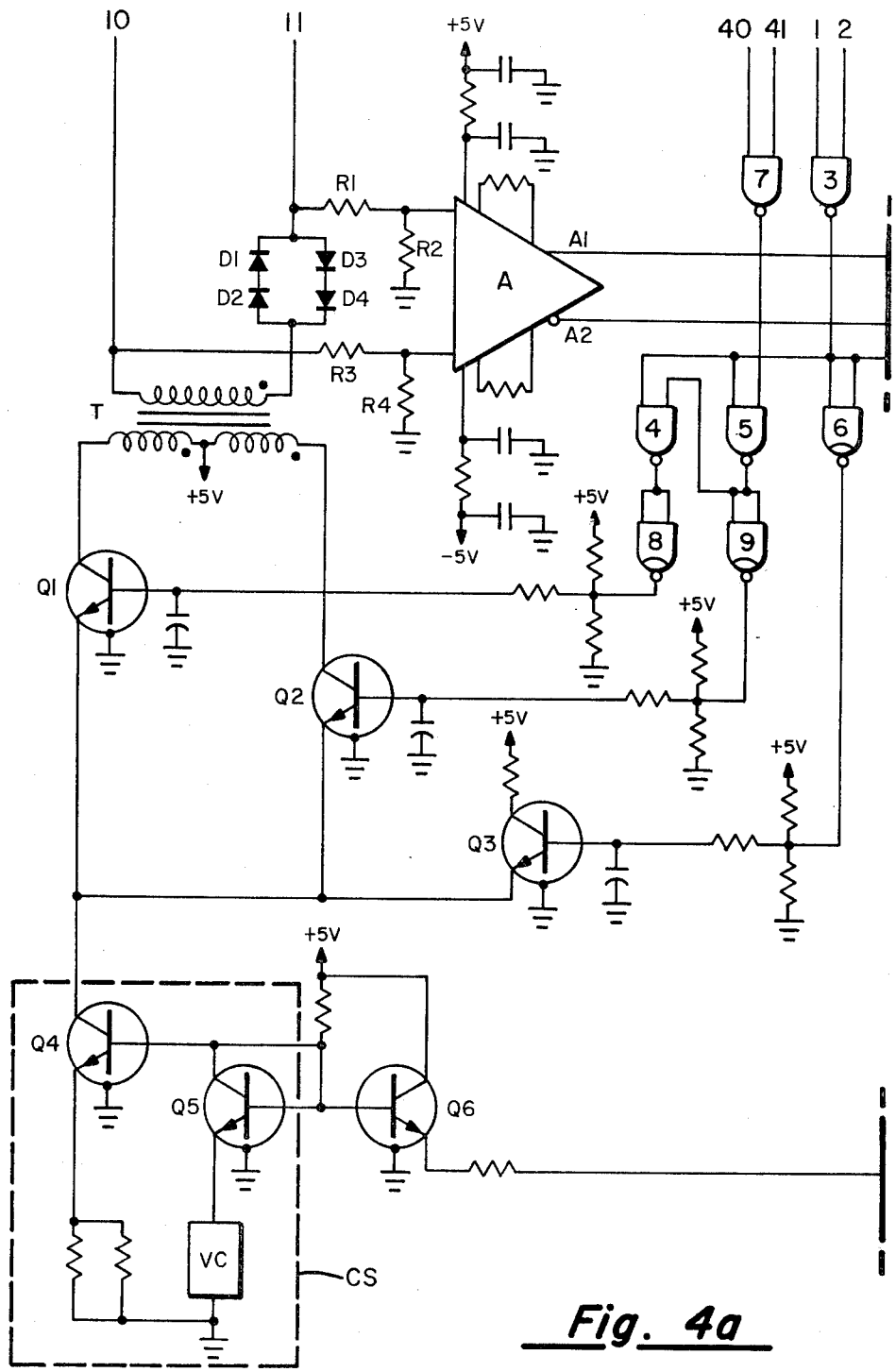
Figure 4B:
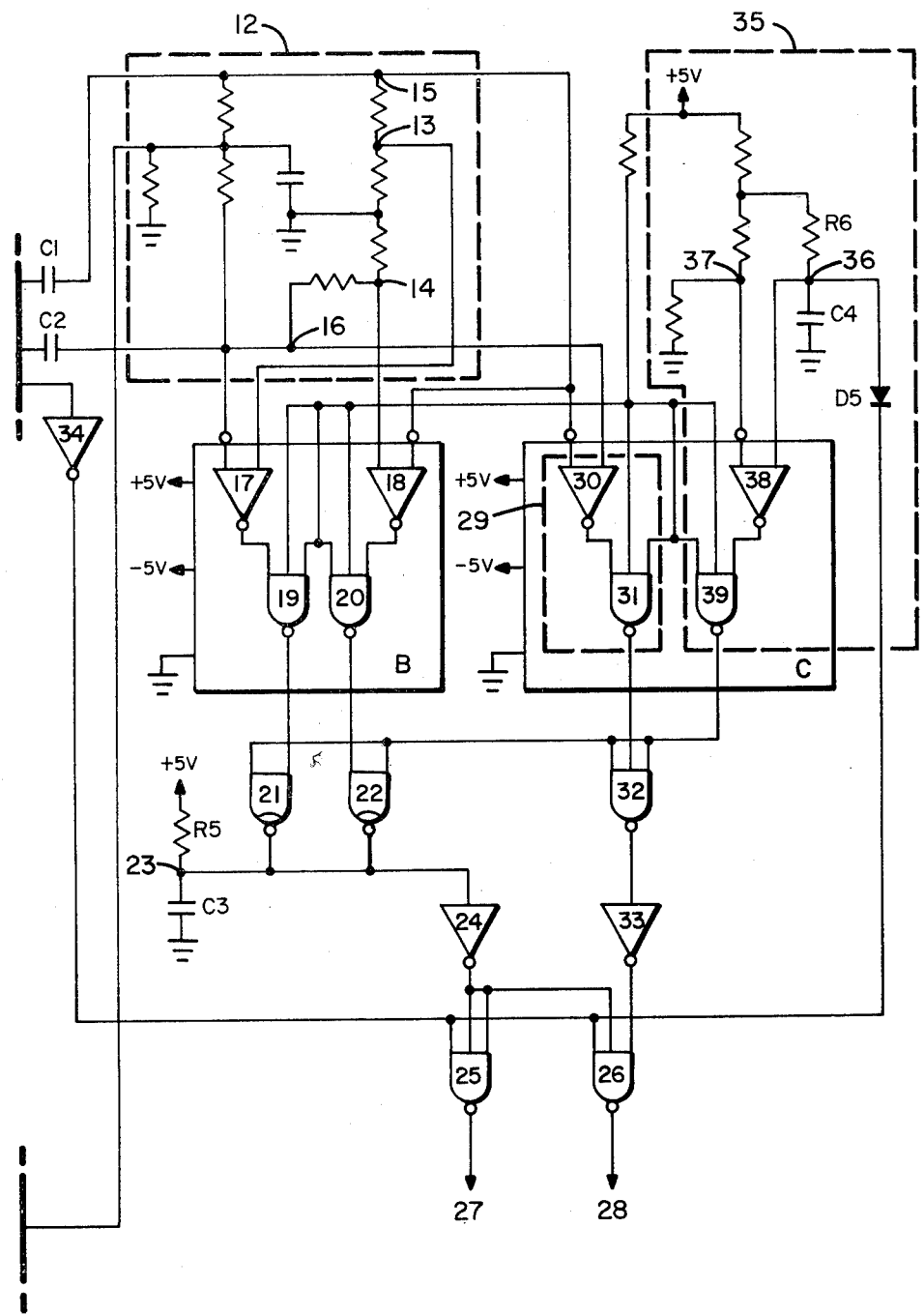
Figure 5A:
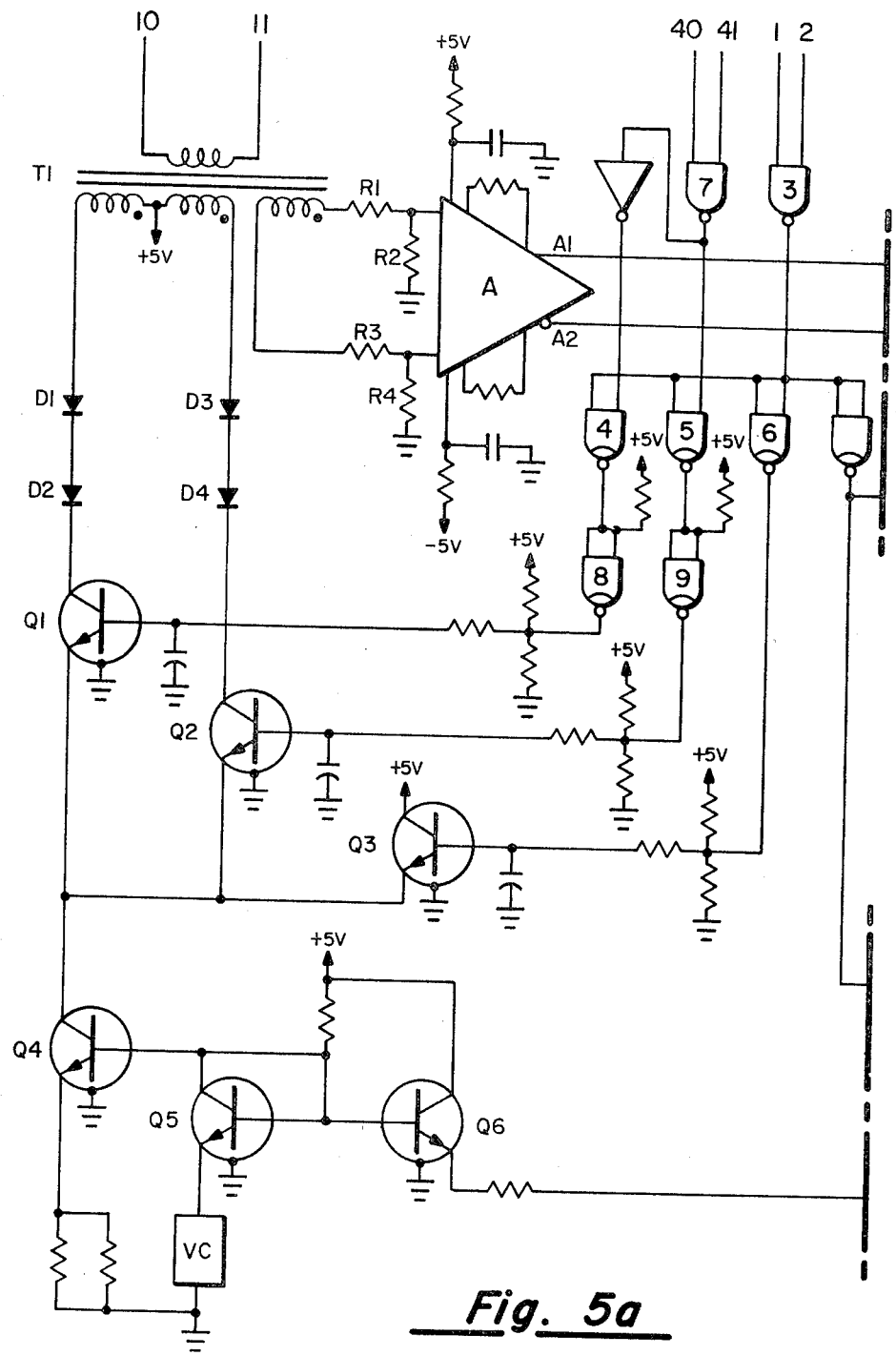
Figure 5B:
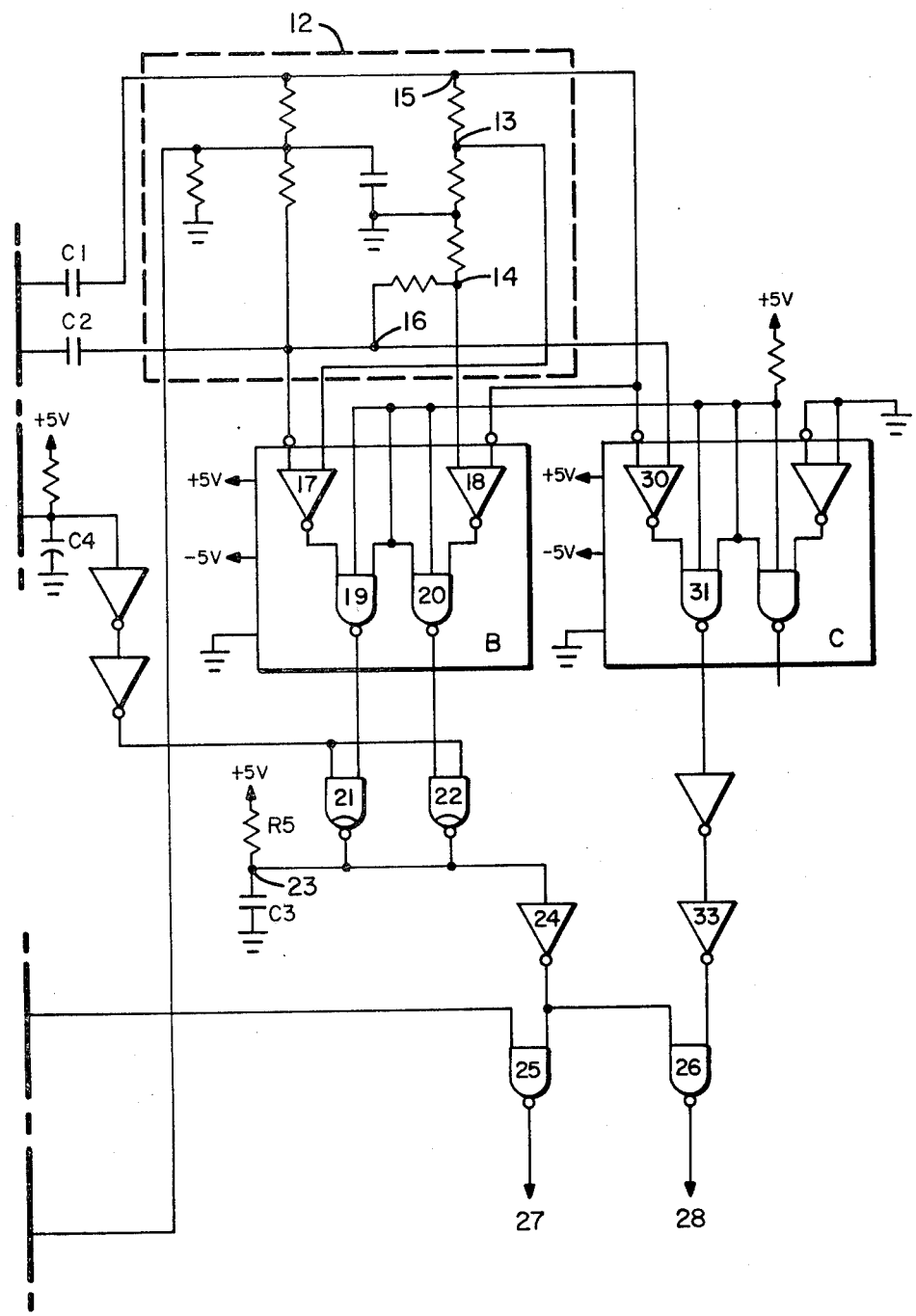
Figure 6A:
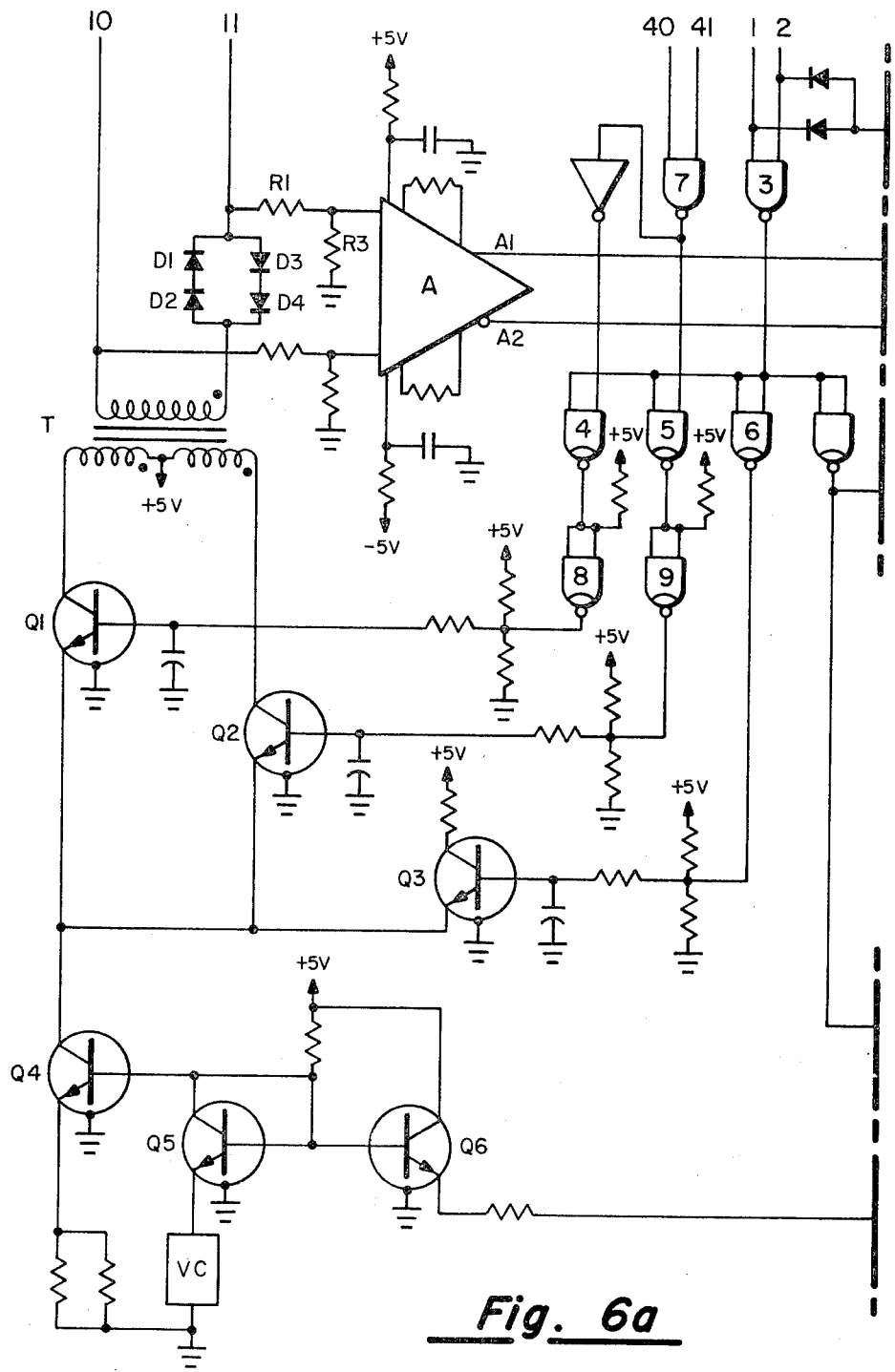
Figure 6B:
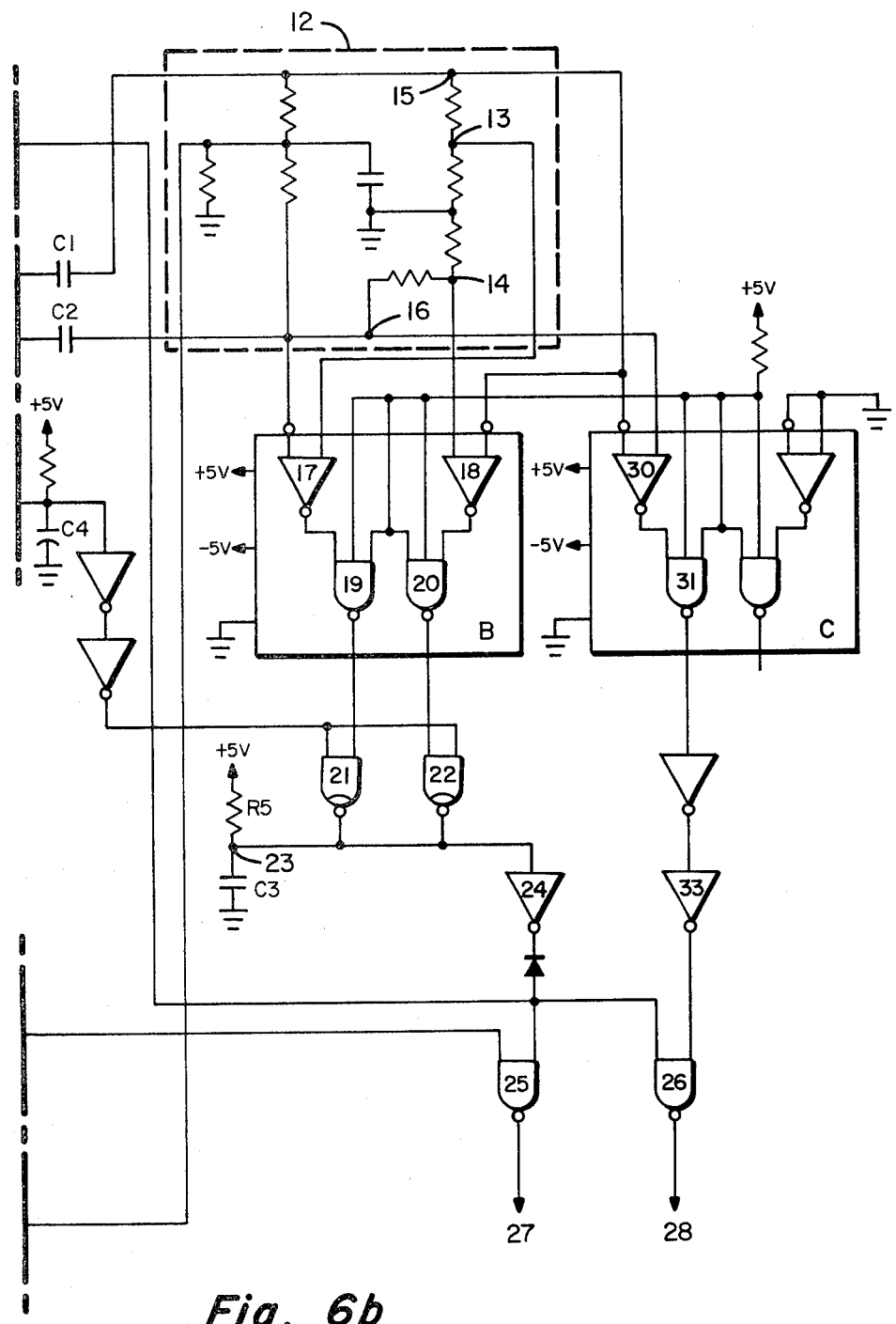

An access module using a 2-inch twisted pair stub to the circuit of FIG. 4A, and a coaxial through conductor physically arranged as shown in FIG. 2B and having an impedance characteristic approximating the transmission line exhibited approximately 0.146 volts peak-to-peak of reflection, see FIG. 2D. A system comprised of 16 of such access modules, equally spaced over approximately 900 feet of transmission line exhibited a summed reflection of approximately 0.364 volts peak-to-peak.

It has been determined, however, that reflections can be further minimized by fabricating the through conductor as a microstrip circuit similar to that shown in FIG. 2C and by mounting the high impedance components necessary for coupling the transceiver to the transmission line on the dielectric substrate. In such an arrangement it is the objective to tailor the combined impedance characteristics of the microstrip and components and minimize interconnect distances to thereby minimize the aggregate reflection at each access module to a level which on the average is equal to the untapped impedance level of the transmission line. An access module constructed in this manner exhibited 0.044 volts peak-to-peak of reflection, see FIG. 2E, and a system of 16 improved modules equally spaced over approximately 900 feet of transmission line exhibited a summed reflection of approximately 0.093 volts peak-to-peak Referring to FIG. 2C the microstrip is fabricated using standard printed circuit technology to form an upper stripline via a dielectric substrate. The impedance between the upper stripline and the lower stripline is then tailored by controlling the substrate thickness and the stripline widths and thicknesses to match the impedance characteristic between the center conductor and the inner shield of the triaxial cable; and the impedance between the lower stripline and the chassis of the access module is tailored to match the impedance between the inner shield and the outer shield. Appropriate male connectors are affixed to the striplines and the access module and insulated from each other so that the female connector attached to the triaxial cable can make electrical contact with the male connectors. The series/parallel diode combination D1, D2 and D3, D4 and the resistors R1 and R3 of the transceiver of FIG. 4 are then connected to the upper and lower striplines via appropriate plated through holes and additional plated holes are provided to make the appropriate connections to the transformer T and differential amplifier A.

It is to be recognized however, that a through conductor similar to the above can be fabricated using flexible printed circuit technology and/or thick film technology to fabricate scaled down versions which can further reduce interconnect distances and the reflection produced at each tap to the transmission line.

Prior to describing the operation of the transceiver connected to the through conductor, it should also be recognized that the Manchester signal is being transmitted over the inner shield and inner conductor to the triaxial cable, neither of which is grounded, and the transmitted signal may be at some common mode level (CML) which differs from the chassis ground.

The operation of the transceiver design of the present invention in its transmit and receive modes of operation will now be described with reference to FIGS. 3 and 4. The transceiver is capable of receiving and transmitting the tri-state Manchester coded signal at a 10 megabit/sec rate at logic levels defined by a differential of ±0.6 volts. Under such a Manchester coding scheme and referring to FIG. 3, a logic "1" is defined as the transition of the signal from +0.6 to −0.6 volts at the middle of the bit period. The binary information content of the signal is determined by decoding circuitry which establishes appropriate lockout periods and time windows between the lockout periods during which time windows the decoding circuitry detects the direction of signal crossing at a reference level of approximately 0 volts. For example, the Manchester signal shown in FIG. 3 corresponds to a binary 110100.

The operation of the transceiver of FIG. 4 in its receive mode is established by impressing a TTL logic high on the inputs 1 and 2 of NAND gate 3 which produces a logic low output. The low output impressed on the inputs to NAND gates 4,5 and 6 causes NAND gates 4, 5, and 6 to produce logic highs, irrespective of any output of NAND gate 7. It is to be recognized that NAND gate 6,8,9,20 and 21 are of the type, such as Texas Instruments Part. No. SN54S03, that are open collector connected so that they can operate as a current sink but not as a current source. The high outputs of NAND gates 4 and 5 impressed on the inputs of respective NAND gates 8 and 9 produce low outputs which impressed on the respective bias circuits to the bases of transistors Q1 and Q2 cause the transistors Q1 and Q2 to turn "off" and not conduct. At the same time that transistors Q1 and Q2 are "off", the high output of NAND gate 6 is impressed on the base of transistor Q3, which causes Q3 to turn "on" and conduct a constant current to ground through the current sink (CS). The current sink (CS) contains transistors Q4 and Q5 and constant voltage source (VC) and acts to establish the constant current flow, which flow is fixed by the valve of the voltage source VC connected between the emitter of transistor Q5 and ground.

With transistors Q1 "off", Q2 "off" and Q3 "on", the transceiver cannot transmit. The nonconduction of transistors Q1 and Q2 ensures that any signals impressed on the inputs of NAND gate 7 cannot induce current flow through transformer T and consequently the transceiver can operate only in its receive mode.

Figure 3:
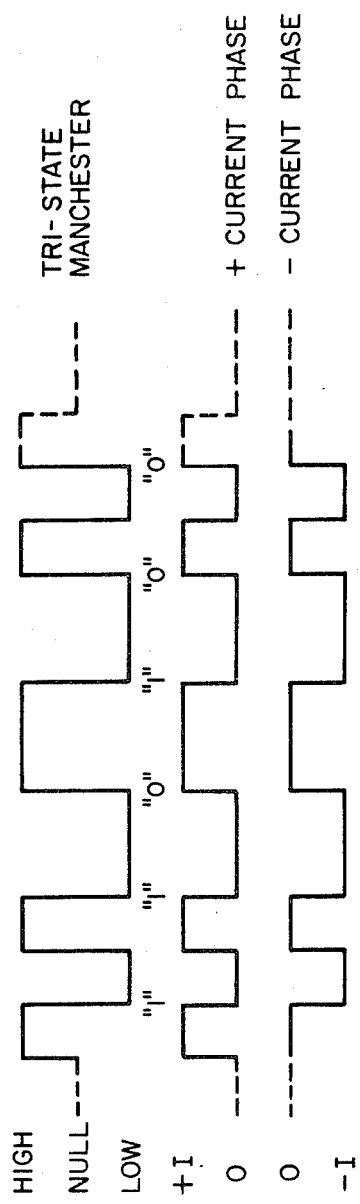
FIG. 3 depicts a square wave representation of a tri-state, low-level serial Manchester coded signal and the respective positive and negative phase currents of the Manchester signal.

With the transceiver in its receive mode of operation, the low-level Manchester coded signal of FIG. 3 at the common mode level is received on conductors 10 and 11 of FIG. 4. Because the data and control information signals associated with the data and control cables are transmitted at $\pm 0.6$ volts maximum, the signal level is too small to overcome the forward threshold voltage drops of the series/parallel combination of diodes D1, D2 and D3, D4 which thereby isolates the transmitter circuitry during the receive mode and minimizes reflections. The receive differential signal, however, is detected by the matched voltage dividers R1, R2 and R3, R4 and attenuated. The voltage dividers are matched to attenuate any common mode signals equally and maintain the condition of common mode rejection. Attenuation is also necessary to stay within the allowable common mode voltage ratings of the video amplifier A and allows making R1 and R3 large, thus minimizing loading on the transmission line.

The attenuated signal, is then amplified by video amplifier A, such as a Texas Instruments Part. No. SN52733, which has a gain sufficient to compensate for the attenuation of the voltage dividers and which reproduces the signals as outputs A1 and A2. The outputs A1 and A2 are indicative of the differential signal transmitted and contain almost none of the common mode signal which may exist on the bus transmission system.

The outputs A1 and A2 are impressed on capacitors C1 and C2. The capacitors C1 and C2 isolate the video amplifier dc output level from the threshold envelope detector 12 and compensate for high frequency roll-off and the complementary error response function of the transmission line. The differential signal is then impressed on the receiver threshold envelope detector 12.

The threshold envelope detector 12 in conjunction with the fixed reference voltage established by constant voltage source VC and transistor Q6, which is "on" and conducting during either the transmit or receive mode, establishes equal threshold voltage differentials between the junctions 13 to 15 and 14 to 16. These voltage diferentials act to establish thresholds to suppress noise and reflections, which thresholds must be exceeded by the signal before it is adjusted to the TTL logic levels compatible with the subsequent logic gates.

In the steady state, none of the received signals exceed the threshold levels, the differential voltage applied to operational amplifiers 17 and 18 of line receiver B, such as a Texas Instruments Part. No. SN55107, via respective junctions 13 and 16, and 14 and 15, back-bias amplifiers 17 and 18 causing them to produce logic highs. The respective logic highs in conjunction with the hardwired logic highs to NAND gates 19 and 20 cause NAND gates 19 and 20 to produce logic lows. The logic lows are then impressed on respective NAND gates 21 and 22 which produce logic highs, irrespective of the input from line receiver C, identical to receiver B. The logic highs are then impressed on junction 23 and inverter 24 causing inverter 24 to produce a logic low. The logic low of inverter 24 is then impressed on NAND gates 25 and 26 causing them to produce logic highs, irrespective of their other inputs. The logic high from NAND gate 25 appearing on output 27 is defined by the system to indicate that the threshold envelope detector 12 is not receiving and the system, therefore, disregards the output of NAND gate 26 appearing on output 28.

When a signal is being received and looking to the conditions that exist during reception of the peak level of the + phase, when A1 is more positive than A2, junction 15 goes more positive, and junction 13 follows junction 16, when junction 13 exceeds junction 16, it forward biases amplifier 17, causing amplifier 17 to produce a logic low, which low causes NAND gate 19 to produce a logic high. The logic high from NAND gate 19 in conjunction with the input from line receiver C, which input will be a logic high during the receive mode, causes NAND gate 21 to sink current. While junction 15 is going more positive, junction 14 goes more negative which increases the reverse bias on amplifier 18. Amplifier 18 therefore continues to produce a logic high, which in conjunction with the hardwired high to NAND gate 20 causes NAND gate 20 to produce a logic low and the logic low impressed on NAND gate 22 causes NAND gate 22 to not sink current.

Junction 23 in response to the above, therefore, has a current sink available via NAND gate 21. NAND gate 21, therefore, acts as a current sink to the charge stored on capacitor C3 during the steady state. The discharge time of C3 is substantially faster than its charge time, which charge time is dependent of R5 and the pull up within NAND gate 22. The discharging of C3 causes the input to inverter 24 to switch to a logic low and inverter 24 responsively produces a logic high. It is to be recognized however, that during the receive mode as amplifiers 17 and 18 are being biased on and off, junction 23 will remain at a logic low so long as signals exceeding the threshold margin of detector 12 are being received. It should also be recognized that the transmission rate can affect the logic state at junction 23, but at the 10 megabit/sec rate, the junction will remain at a logic low.

While the threshold envelope detector 12 is responding to the differential signal being received from A1 and A2, the zero crossing detector 29, comprised of the differential amplifier 30 and NAND gate 31 contained in line receiver C, operates to detect the direction of the polarity changes of the received signals. As a precondition of the validity of the operation of zero crossing detector 29 during the receive mode, the transmission system requires that the first signal of a reception begin with a logic 1. Upon reception of a signal and assuming that junction 15 is more positive than junction 16, amplifier 30 would be forward biased causing it to produce a logic low. The logic low in conjunction with the hardwired logic highs to NAND gate 31 would cause NAND gate 31 to produce a logic high. When junction 15 is more negative than junction 16, amplifier 30 will produce a logic low, which low causes NAND gate 31 to produce a logic low. When NAND gate 32 is then inverted by inverter 33 to a logic low. The logic low from inverter 33 then causes NAND gate 26 to produce a logic high on output 28, irrespective of any of its other inputs. A logic high from NAND gate 31 alternatively causes a logic low on output 28.

The zero crossing detector will operate whenever a signal exceeds the internal threshold differential of amplifier 30. It is for this reason that the subsequent decoding circuitry coupled to outputs 27 and 28 looks for a logic low on output 27 before it responds to any signal appearing on output 28, since this condition indicates that the transceiver is in its receive mode of operation and that valid information is being received from the transmission line. It is also the be recalled that the system decoding circuitry will also not respond to the output 28 until the first binary "1" is received.

During the receive mode, it should also be recognized that the logic low from NAND gate 3 is also impressed on inverter 34 causing it to produce a logic high. The logic high from inverter 34 is then impressed on NAND gates 25 and 26 and lockout timer 35. Impressing the logic high from inverter 34 on timer 35 back biases diode D5. Capacitor C4 consequently charges to a positive level via resistor R6 such that a differential voltage exists between junctions 36 and 27, which differential voltage forward biases operational amplifier 38, contained in line receiver C, causing amplifier 38 to produce a logic low. The logic low of amplifier 38 in conjunction with the hardwired high inputs to NAND gate 39 causes NAND gate 39 to produce a logic high, which logic high is impressed on NAND gates 21, 22 and 32. The operation of NAND gates 21 and 22, however, are not affected by the logic high from NAND gate 39, since receiver B responding to detector 12 controls the other inputs to NAND gates 21 and 22. The operation of NAND gate 32 is also not affected by the logic high from NAND gate 39, since the output of NAND gate 32 will be dependent on the input from the zero crossing detector 29.

Should either of inputs 1 or 2 switch to a logic low, which causes the transceiver to operate in its transmit mode, NAND 3 will produce a logic high causing inverter 34 to produce a logic low, which low forward biases diode D5 and causes capacitor C4 to discharge rapidly. Amplifier 38 is then reverse biased, causing lockout timer 35 to produce a logic low. This logic low then controls the operation of NAND gates 21, 22, and 32 causing inverters 24 and 33 to produce logic lows, which lows cause NAND gates 25 and 26 to produce logic highs on outputs 27 and 28. The logic highs on outputs 27 and 28 again being interpreted by the subsequent system decoding circuitry as indicating that the transceiver is not in its receive mode of operation. The lockout condition will also continue, even after inputs 1 and 2 return to logic highs, until C4 charges and junction 36 reaches a voltage level exceeding the level at junction 37. This lockout prevents the last portion of a transmit signal from being interpreted as a start of a receive signal.

The operation of the transceiver will now be described in its transmit mode of operation with reference to FIGS. 3 and 4. This mode is established by impressing a logic low on either of inputs 1 or 2, which as previously described causes NAND gates 25 and 26 to simultaneously produce logic highs which highs indicate to the subsequent decoding circuitry that the receiver isn't enabled and that any output from NAND gate 26 is to be disregarded. A logic low on either input 1 or 2 causes NAND gate 3 to produce a logic high which high is then impressed on NAND gates 4, 5 and 6. NAND gate 6 then produces a logic low, which low causes transisitor Q3 to turn off and not conduct during the transmit mode. Since one of the transistors Q1, Q2 or Q3 is always "on", it is to be recognized that the current drawn by the transceiver remains relatively constant and, therefore, small amounts of power line filtering can be used.

With the output of NAND gate 3 at a logic high, the output of NAND gate 7 determines what signals are being transmitted. It is to be recognized, however, that during the transmit mode, TTL logic signals are impressed on only one or the other of the inputs 40 or 41 of NAND gate 7, while the other input is held at a logic high. Assuming a logic high is impressed on input 40 with 41 held high, NAND gate 7 produces a logic low which low causes NAND gate 5 to produce a logic high, which high is then impressed on NAND gate 5 to produce a logic high, which high is then impressed on NAND gates 9 and 4. NAND gate 9 functionally acting as an inverter, inverts the logic high to produce a logic low which causes transistor Q2 to turn "off" and not conduct. NAND gate 4 however, responds to the logic high from NAND gate 5 and produces a logic low, which low is inverted by NAND gate 8, since NAND gate 8 is also functionally acting as an inverter, to a logic high. The logic high from NAND gate 8 then causes transistor Q1 to turn "on" and conduct.

With transistor Q1 "on", current will flow through half of the secondary winding of transformer T, transistor Q1 and the current sink CS to ground. The current flow through the secondary winding of transformer T induces current to flow through the diodes D1 and D2, coupled to the primary of transformer T, and due to the impedance characteristics of the transmission line coupled to conductors 10 and 11, this current flow produces a positive bi-phase voltage signal of approximately +0.6 volts peak, which corresponds to the logic high from input 40. As the logic state of the information on input 40 changes from a logic high to a logic low, transistors Q1 and Q2 will respectively turn "off" and "on" and the induced current will now flow through diodes D3 and D4, which will produce a negative bi-phase voltage signal of approximately 0.6 volts peak.

While the data is being received on inputs 40 and 41 at high TTL logic levels, it is being reproduced as the composite tri-state, low-level serial Manchester coded data of FIG. 3 on the transmission line. The receiver circuitry of the transceiver however, also responds to the transmitted signal, since its inputs are directly coupled to the primary windings of transformer T. The outputs 27 and 28, however, are held at logic high during and for a period subsequent to the transmit mode by inverter 34 and lockout timer 35 as previously described and the subsequent decoding circuitry accordingly interprets the outputs.

Figure 5:
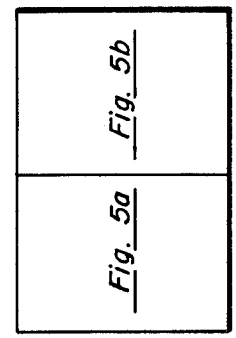
FIG. 5 comprised of FIGS. 5a and 5b is an alternative embodiment of FIG. 4 providing a different transceiver isolation scheme and a different receiver lockout timing scheme.

An alternative embodiment of the high impedance transceiver is shown in FIG. 5. In this embodiment the receiver and transmitter circuitry are substantially the same as for the previously described embodiment in FIG. 4, but the transformer T1 and the diode combination for isolating the circuitry has been modified.

Referring to FIG. 5, this embodiment differs in that the transmitter and receiver circuitry of the transceiver are both isolated from the transmission line via transformer T1. The primary windings of transformer T. are coupled to the conductors 10 and 11. The secondary windings of the transformer T1 are split with one portion coupled to the voltage dividers R1, R2 and R3, R4 of the receiver circuitry and the other portion of the secondary winding to tapped at its center tap of the secondary windings on T1 and the respective collectors of transistors Q1 and Q2. This embodiment, however, functionally operates the same as the embodiment of FIG. 4, but the isolation and lockout timing are achieved in slightly different fashions via the circuit changes.

Figure 6:
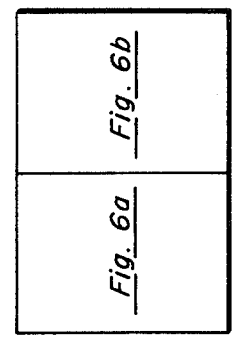
FIG. 6 comprised of FIGS. 6a and 6b is an alternative embodiment of FIG. 4 providing a third receiver lockout timing scheme.

An additional alternative embodiment of the transceiver of FIG. 4, which also functionally operates in the same manner, is shown in FIG. 6. This embodiment employs the same isolation technique as in the embodiment of FIG. 4, but the lockout timing has been improved over that shown in FIG. 5.

Figure 7:
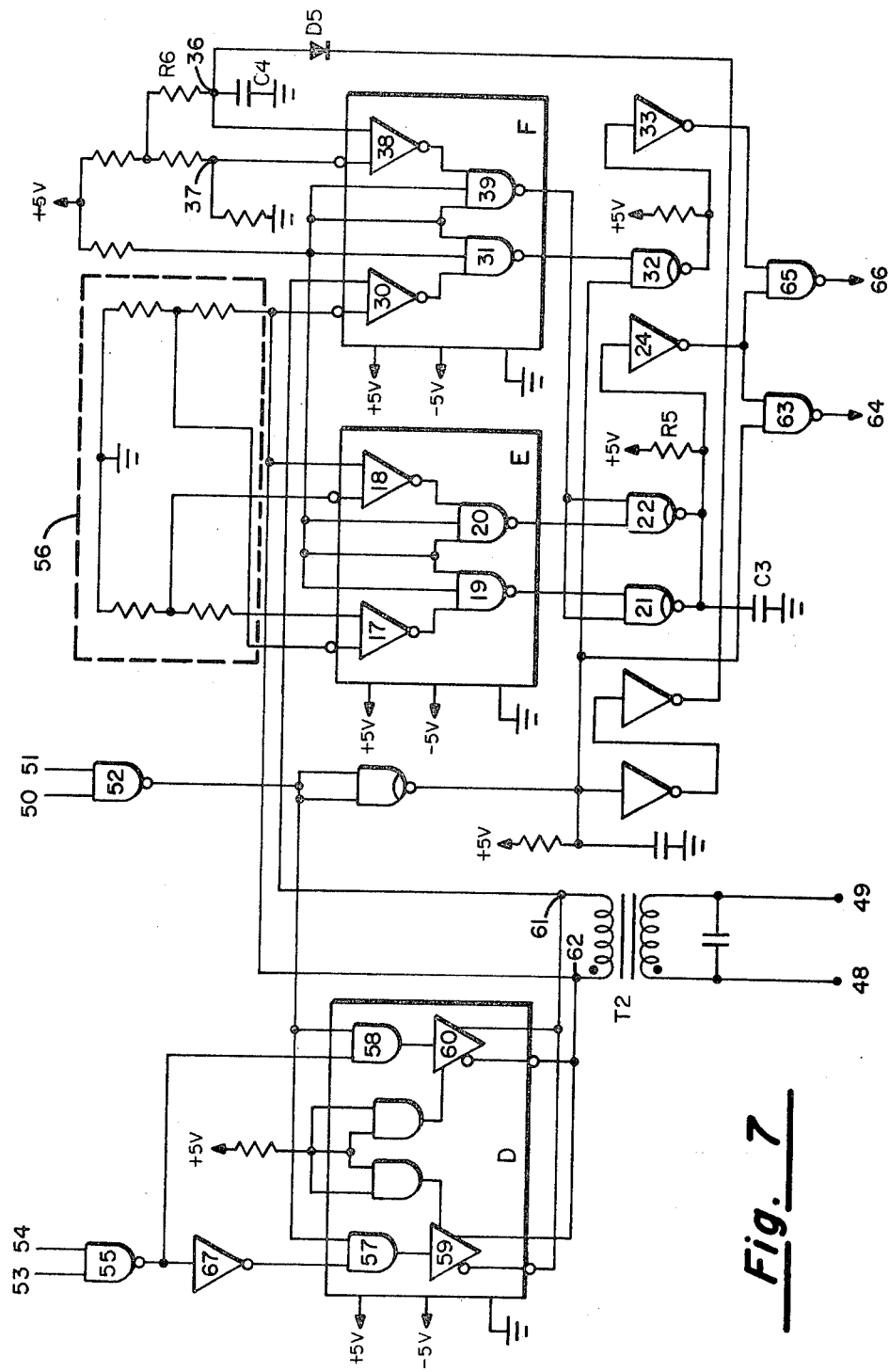
FIG. 7 is a schematic diagram of the low impedance transceiver associated with each input/output port of a bus access module.

While specific attention has been called to the high impedance transceiver design of an access module, each access module also contains a compatible and similarly constructed low impedance transceiver. Referring to FIG. 7 a low impedance transceiver design functionally similar to the transceiver of FIG. 4 is shown. The transceiver is used for making the point-to-point connections between the BSIU's and the access modules of FIG. 1. The transceiver is, therefore, reproduced in each BSIU and in each access module at each stub cable input/output port. A two port access module with the appropriate transceiver interconnections is shown in FIG. 8, but it is to be recognized that access modules requiring more ports would be similarly configured with the input NAND gates, such as 3, 7, 52 and 55, having an appropriate increase in their number of inputs.

The low impedance transceiver functionally operates in the same manner as the transceiver of FIG. 4 and like the transceiver of FIG. 4 is used in a BAM as a repeater of the binary information being transmitted over the system, whether it be in the point-to-point or in the broadcast mode and whether or not it is transmitted over the primary transmission line via the high impedance transceiver. The transceiver of FIG. 7 is operable in either a transmit or receive mode to transmit and receive the tri-state Manchester signals of FIG. 3 via its associated stub cable or receive and transmit the two state, two wire, TTL level control and data signals to the other transceivers interconnected with itself in the BAM. The transceiver design differs from that of FIG. 4 primarily in that the dual line driver D, Texas Instruments Part No. SN55110, is being used as the current driver to drive transformer T2, when the transceiver is in its transmit mode; and in combination with the threshold envelope detector 56 to establish similar differential margins as those set by threshold envelope detector 12, when the transceiver is in its receive mode.

Figure 8:
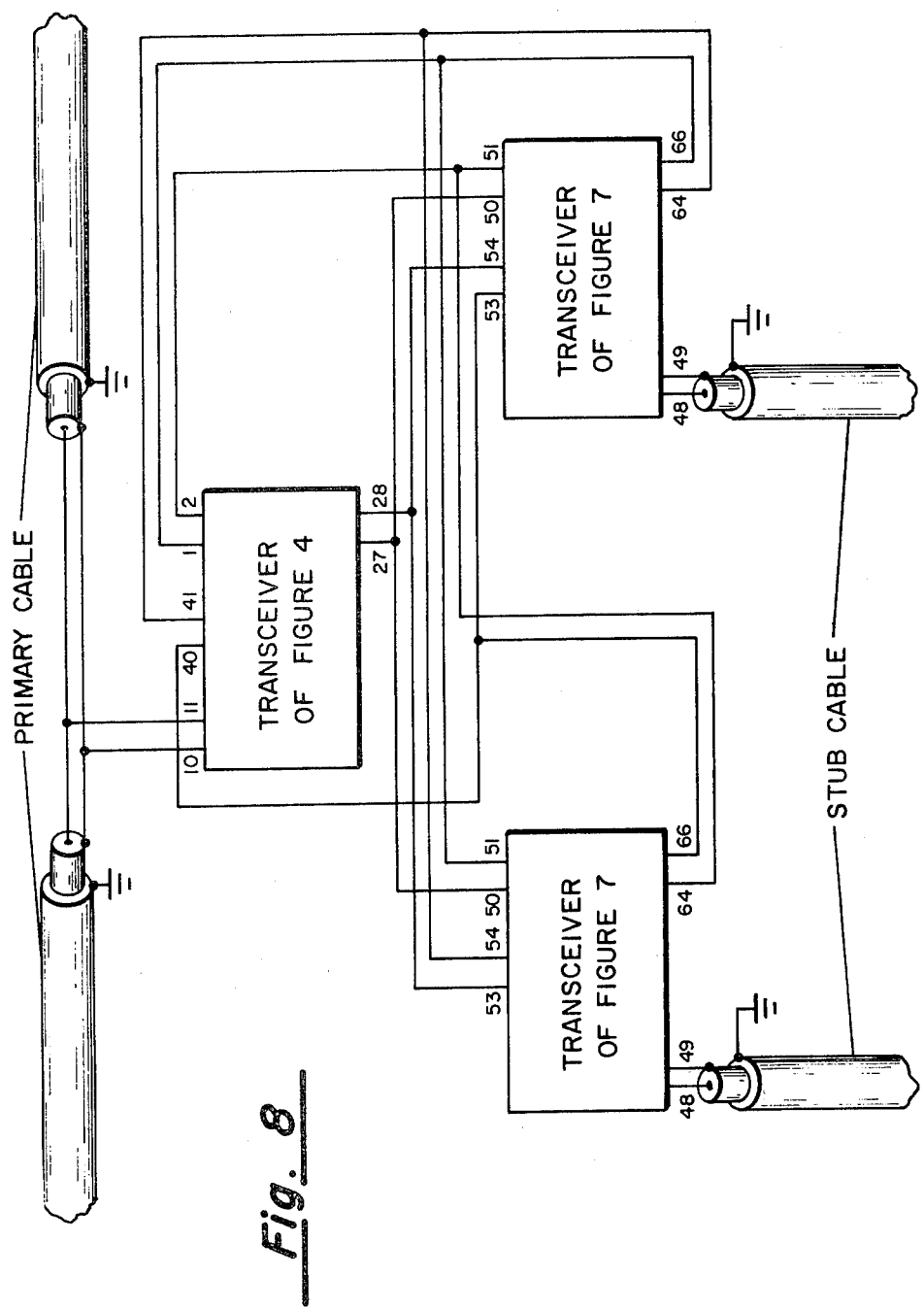
FIG. 8 is a block diagram of a two port bus access module and the interconnection of the respective transceivers.

Referring to FIGS. 7 and 8, the transceiver operates in its transmit mode when a logic low control signal, which indicates that the threshold envelope detector 56 is receiving valid information from one of the associated transceivers is impressed on either of the inputs 50 or 51 of NAND gate 52 while the other input is at a logic high. The two state, TTL data signals, corresponding to the received information, being transmitted by the associated transceiver are simultaneously impressed on one of the inputs 53 or 54 of NAND gate 55, while the other input from the other associated transceiver is at a logic high. The inputs to NAND gates 57 and 58, of driver F will, therefore, responsively switch with the data signals with one or the other of the inputs always at a logic low depending on the output of NAND gate 55 and inverter 67. The differential amplifiers 59 and 60 responding to the alternating outputs of NAND gates 57 and 58 will consequently alternate as either a current sink or a current source, thus switching the direction of current flow through transformer T2 and the threshold envelope detector 56, thereby inducing the positive and negative bi-phase signals of FIG. 3 on the stub cable connected to the primary winding of transformer T2 via conductors 48 and 49. The identical low impedance transceiver within the BSIU coupled to the other end of the stub cable will receive the Manchester signal being transmitted and convert the received signal to two-state, control and data signals at TTL levels indicating that valid information is being received and what the information is. The BSIU then couples this information to its user for decoding or further processing.

The receive mode for the transceiver of FIG. 7 is established by impressing logic high control signals from the associated transceivers on inputs 50 and 51, thereby causing NAND gate 52 to produce a logic low, which low impressed on NAND gates 57 and 58 of line driver D causes the true output of each of the differential amplifiers 59 and 60 to source current and the complement output of the other amplifier to sink the current, thereby causing the potentials on junctions 61 and 62, due to the matched loads on the junctions to ground via the threshold detector 56, to be the same in the steady state condition. When a Manchester signal is received from the stub cable on conductors 48 and 49, the potentials on junctions 61 and 62 respond to the signal level changes causing the differential amplifiers 17 and 18 of line receiver E, identical to receiver F, B and C, to responsively be biased on and off and switch their outputs between logic highs and lows in the same manner as the transceiver of FIG. 4 to produce an output on NAND gate 63 indicative of whether or not the transceiver is receiving valid signals. A logic low on output 64 of NAND gate 63 is again defined as indicating that valid information is being received.

The changing polarities on junctions 61 and 62 similarly cause the zero crossing detector comprised of amplifier 30 and NAND gate 31 of receiver F to responsively switch with the polarity changes and produce corresponding two state, data signals at TTL levels on output 66 of NAND gate 65.

The lockout timing circuitry of the transceiver of FIG. 7 functions the same as for the transceiver of FIG. 4 but the associated output from through line receiver F is connected in a slightly different manner wherein the charge and discharge times of capacitors C4 and C5 are adjusted so that together they prevent the last protion of a transmitted bi-phase signal from being interpreted as the start of a receive signal.

A bus access module comprised of the microstrip circuit of FIG. 2 and the transceivers of FIGS. 4 and 7 and interconnected in the manner of FIG. 8, therefore, enables the transmission line to associated stub cables or from one stub cable to each of the other associated stub cables and the primary transmission line. Such as access module further enables a distributed transmission system of the type shown in FIG. 1 or other distributed system architectures.

While the invention has been shown and described with reference to the preferred embodiment, it should be apparent to those skilled in the art that further modifications may be made without departing from the spirit or scope of the invention. It is, therefore, intended that the invention not be limited to the specific of the foregoing description of the referred embodiment, but rather as to embrace the full scope of the following claims:

I claim:

1. Apparatus for passively coupling signals between a transceiver and a transmission line having at least a first and a second conductor and a characteristic impedance therebetween, comprising in combination:

a microstrip comprising:
- a first and a second electrically conductive strip,
- first and second connector means for connecting said first and second conductor to said respective first and second strips,
- a dielectric substrate separating and insulating said first strip from said second strip, and
- said first and second strips formed and arranged in combination with said connector means so as to exhibit substantially the same impedance characteristic as exhibited by said transmission line, receiver coupling means mounted on said microstrip and connected, without inductive or capacitative coupling to said first and second strips and to a receiver section of said transceiver and having a high impedance characteristic with respect to said transmission line and said first and second strips for attenuating signals received from said transmission line and coupling the attenuated signals to said receiver section during receptions, comprising:
- first voltage dividing means connected to a voltage source and having a first input and a second output terminal said first terminal connected to said first conductor and said second terminal connected to said receiver section for attenuating received signals via voltage division, and
- second voltage dividing means connected to said voltage source having a third input and fourth output terminal, said third terminal connected to said second conductor and said fourth terminal to said receiver section for attenuating received signals via voltage division, transmitter coupling means connected to said first and second strips and inductively coupled to a transmitter section of said transceiver and having a low impedance characteristic with respect to said transmission line during transmissions for conducting signals from said transmitter section to said transmission line during transmissions and not conducting signals during receptions, comprising;
- first diode means mounted on said microstrip and having a fifth and a sixth terminal, said fifth terminal connected to said first strip, and a conductive threshold greater than the received signals for blocking received signals and conducting transmitted signals,
- second diode means mounted on said microstrip and having a seventh and an eighth terminal, said seventh terminal connected to said first strip, and a conductive threshold greater than the received signals for blocking received signals and conducting transmitted signals, and
- transformer means having a primary winding with ninth and tenth terminals and a secondary winding with eleventh and twelfth terminals, said ninth terminal connected to said sixth and eighth terminals, said tenth terminal connected to said second strip and said eleventh and twelfth terminals connected to said transmitter section for inductively coupling said transmitter section to said first and second diode means during receptions.

* * * * *